(12) United States Patent
Uguen

(10) Patent No.: US 6,947,706 B2
(45) Date of Patent: Sep. 20, 2005

(54) DEVICE FOR GENERATING A CLOCK SIGNAL

(75) Inventor: Emeric Uguen, La Fresnaye Au SauvageEindhoven (FR)

(73) Assignee: Koninklijke Philips Electronics N.V., Eindhoven (NL)

(*) Notice: Subject to any disclaimer, the term of this patent is extended or adjusted under 35 U.S.C. 154(b) by 524 days.

(21) Appl. No.: 10/264,896

(22) Filed: Oct. 4, 2002

(65) Prior Publication Data

US 2003/0069041 A1 Apr. 10, 2003

(30) Foreign Application Priority Data

Oct. 9, 2001 (FR) .............................................. 01 12981

(51) Int. Cl.$^7$ .............................. H04B 5/00; G06F 1/04
(52) U.S. Cl. ....................... 455/41.2; 713/600; 327/291
(58) Field of Search ........................ 455/39, 41.1, 41.2; 713/600; 327/291, 296, 170; 340/10.1

(56) References Cited

U.S. PATENT DOCUMENTS

| 5,418,353 A | * | 5/1995 | Katayama et al. | ........... 235/380 |
| 6,125,452 A | * | 9/2000 | Kuriyama | ................... 713/600 |
| 6,765,959 B1 | * | 7/2004 | Tanaka et al. | .............. 375/239 |

* cited by examiner

*Primary Examiner*—Nguyen T. Vo
(74) *Attorney, Agent, or Firm*—Aaron Waxler (57) ABSTRACT

A device 212 for generating an output clock signal 213 intended to time a digital processing circuit 204, the generating device receiving a first clock signal 209, characterized in that it comprises an oscillator generating a second clock signal constituting the output clock signal, the oscillator functioning in a forced mode under the control of the rising and falling edges of the first clock signal, the oscillator functioning in a free mode in the absence of rising or falling edges in the first clock signal, the natural frequency of the oscillator being lower than the frequency of the first clock signal.

Use: clock signal generator.

5 Claims, 5 Drawing Sheets

DEVICE FOR GENERATING A CLOCK SIGNAL

FIELD OF THE INVENTION

The invention relates to a device for generating an output clock signal intended to time a digital processing circuit, said generating device receiving a first clock signal.

The invention has many applications, in particular in smart card readers.

TECHNOLOGICAL BACKGROUND TO THE INVENTION

Smart cards include memory elements dedicated to the storage of information, such as information on the identity of an individual (for example the name, address etc) or relating to administrative data for an individual (for example social security number, bank reference etc.). Smart cards also include processing circuits for performing operations on the data stored in said memory elements, conjointly with the data sent by a smart card reader. This is particularly the case in certain operations of the bank transaction type in which the smart card becomes a separate data processing unit. For the processing of data performed in parallel between the smart card reader and the smart card to be possible, the smart card reader supplies a clock signal to the smart card. The purpose of this clock signal is to time the digital processing circuits disposed on the smart card.

Figure 1:
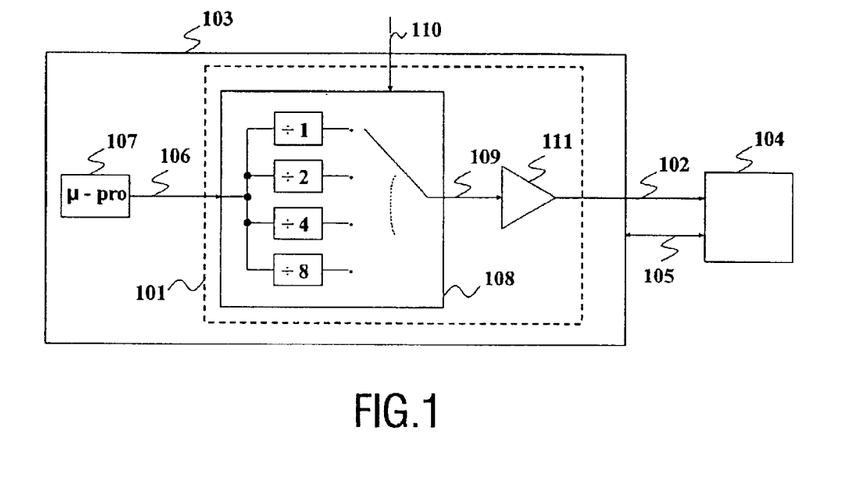
FIG. 1 is a functional representation of a device for generating a clock signal which is known from the state of the art.

In a known fashion, FIG. 1 depicts a device 101 for generating an output clock signal 102. The generating device 101 is disposed in a smart card reader 103. Said output clock signal 102 is applied to the smart card 104 when the latter is in read or write configuration allowing dialogue 105 with the smart card reader.

The generating device 101 receives an input clock signal 106 delivered by the internal clock of the microprocessor 107 and responsible for the various processing operations on the smart card reader. In order to adapt the frequency of the output clock signal 102 to the processing characteristics of the smart card 104, a frequency divider 108 receives the input clock signal 106 at its input and delivers a clock signal 109, referred to as the first clock signal, which has undergone a frequency division. The frequency of the input clock signal 106 is thus divided by a factor of 1, 2, 4 or 8, depending on the value of a control signal 110. The signal 109 is amplified by the stage 111, which delivers said output clock signal 102.

The device described in FIG. 1 has many functional limitations, in particular when said first clock signal 106 received by the generating device 101 stops.

Actually, such a generating device does not make it possible to deliver an output clock signal 102 when the input clock signal 106 delivered by the microprocessor 107 stops. The stoppage of the input clock signal 106 delivered by the microprocessor can in particular occur following a drop in the supply voltage to said microprocessor. When this occurs, the input clock signal 106 remains either at a high binary level or at a low binary level. The consequence of this is that the first clock signal 109 and the output clock signal 102 remain respectively either at a high binary level or at a low binary level, which risks damaging the processing circuits of the smart card which are timed by the output clock signal 102. In addition, the processing operations being executed on the smart card are abruptly stopped, which may result in the storage of erroneous data in the memory elements of the smart card.

SUMMARY OF THE INVENTION

The object of the invention is to remedy these limitations by proposing a device for continuously generating an output clock signal even in the event of stoppage of the clock signal delivered by the microprocessor of the smart card reader.

To this end, the invention is characterized in that the device generating the output clock signal comprises an oscillator generating a second clock signal constituting said output clock signal, said oscillator functioning in a forced mode under the control of the rising and falling edges of said first clock signal, said oscillator functioning in a free mode in the absence of rising or falling edges in said first clock signal, the natural frequency of said oscillator being lower than the frequency of said first clock signal.

The oscillator has the characteristic of functioning according to two distinct modes: in the forced mode when said first clock signal is actually present, in the free mode when said first clock signal is stopped. Said first clock signal corresponds in particular to a clock signal delivered by a microprocessor, possibly after frequency division by a factor of 1, 2, 4 or 8. The automatic and immediate switching from the forced mode to the free mode, as soon as said first clock signal stops, makes it possible to generate an output clock signal without discontinuity. Thus the circuits of the smart card receiving the output clock signal continue to be timed, and hence the processing operations currently being carried out on the smart card can continue.

Another embodiment of the invention is characterized in that the device generating the output clock signal comprises:

an oscillator generating a second clock signal, said oscillator functioning in a forced mode under the control of the rising and falling edges of said first clock signal, said oscillator functioning in a free mode in the absence of rising or falling edges in said first clock signal, the natural frequency of said oscillator being lower than the frequency of said first clock signal, detection means for detecting the presence or absence of rising or falling edges in said first clock signal, in order to generate a control signal with two logic levels, a first logic level indicating the presence of rising or falling edges in said first clock signal, a second logic level indicating the absence of rising or falling edges in said first clock signal, a multiplexer receiving as an input said first clock signal and said second clock signal, said multiplexer generating at its output said output clock signal, said multiplexer being controlled by said control signal in order to switch said first clock signal onto its output if said control signal is in its first logic level, or for switching said second clock signal onto its output if said control signal is in its second logic level.

Just as in the first embodiment, the oscillator has the characteristic of functioning according to two distinct modes: in a forced mode when said first clock signal is actually present, in a free mode when said first clock signal is stopped. Said first clock signal corresponds in particular to a clock signal delivered by a microprocessor, after any frequency division by a factor of 1, 2, 4 or 8. The automatic and immediate switching from the forced mode to the free mode, as soon as said first clock signal stops, makes it possible to generate an output clock signal without discontinuity. Thus the circuits in the smart card receiving the output clock signal continue to be timed, and the processing currently being carried out on the smart card can thus continue.

In addition, the use of the multiplexer has the advantage of generating, when said first clock signal delivered by the microprocessor is actually present, an output clock signal having a very slight shift in time compared with said first clock signal. Thus the processing circuits timed by the output clock signal and the processing circuits timed by said first clock signal are timed synchronously, which contributes to a greater reliability in processing and data exchange between the various processing circuits.

In addition to the fact that the control signal triggers the switching of the multiplexer, this control signal can advantageously serve to inform the smart card reader and the smart card that the input clock signal delivered by the microprocessor has stopped. Thus, under the action of this control signal, a procedure can be triggered for rapidly and rigorously finishing the processing being carried out on the smart card reader or on the smart card.

When the input clock signal delivered by the microprocessor is actually present, the frequency of the output clock signal generated by the device according to the invention is identical to the frequency of said first clock signal. On the other hand, when said first clock signal is stopped, the frequency of the output clock signal is the natural frequency of said oscillator.

The functioning of the generating device according to the invention is guaranteed if the natural frequency of the oscillator is lower than the frequency of said first clock signal. This leads to an inexpensive solution since any good quality oscillator with a natural frequency lower than the frequency of said first clock signal can be chosen, even if its natural frequency undergoes variations over time.

This difference in frequency in the output clock signal, between the forced mode and the free mode, has no effect on the processing circuits disposed on the smart card which are insensitive to the precision of the frequency of the clock signal. However, should these processing circuits require a clock signal with a frequency which is stable over time, the invention has an additional characteristic.

This is because the invention is characterized in that the generating device comprises slaving means for slaving the natural frequency of said oscillator to a frequency which is lower than the frequency of said first clock signal by a few percentage points.

Thus the output clock signal keeps the same frequency during the period when the device is functioning in the forced mode as during the period when the device is functioning in the free mode.

The invention also relates to a smart card reader comprising a device for generating an output clock signal as described above.

The invention also relates to a portable telephone comprising a smart card reader, said smart card reader comprising a device for generating an output clock signal as described above.

BRIEF DESCRIPTION OF THE DRAWINGS

The invention will be further described with reference to examples of embodiments shown in the drawings to which, however, the invention is not restricted.

DESCRIPTION OF EMBODIMENTS OF THE INVENTION

Figure 2:
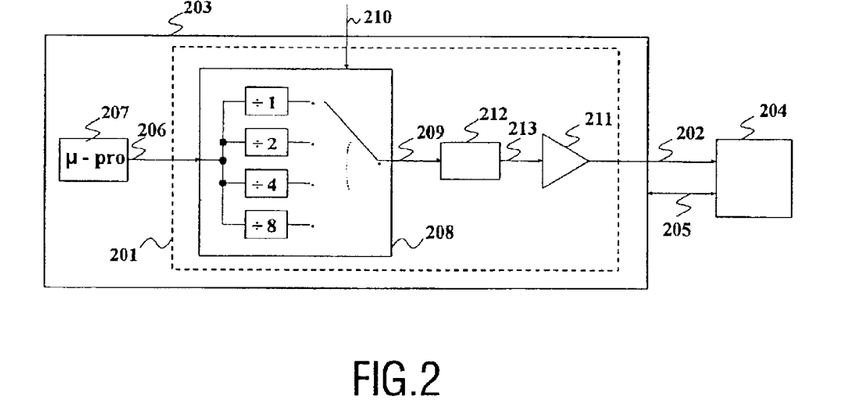
FIG. 2 is a functional representation of a device for generating a clock signal according to the invention.

FIG. 2 is a functional representation of a device for generating a clock signal according to the invention. The generating device 201 is disposed in a smart card reader 203. Said output clock signal 202 is applied to the smart card 204 when the latter is in read or write configuration allowing a dialogue 205 with the smart card reader.

The generating device 201 receives an input clock signal 206 delivered by the internal clock of the microprocessor 207 responsible for the various processing operations on the smart card reader. To adapt the frequency of the output clock signal 202 to the processing characteristics of the smart card 204, a frequency divider 208 receives the input clock signal 206 at its input and delivers a first clock signal 209, said first clock signal having undergone a frequency division. The frequency of the input clock signal 206 is thus divided by a factor of 1, 2, 4 or 8, depending on the value of a control signal 210.

The invention is distinguished from the state of the art in that a functional unit 212 is connected in cascade at the output of the frequency divider 208. The functional unit 212 thus receives as an input the first clock signal 209 and delivers as an output a new clock signal 213, referred to as the second clock signal. The clock signal 213 is possibly followed by an amplification stage 211 which delivers said output clock signal 202, depending on the impedance and level characteristics required by the circuits receiving the clock signal 202.

The function of the functional unit 212 is to guarantee the continuous generation of said second clock signal 213, and consequently the continuous generation of the output clock signal 202, even after the stoppage of said first clock signal 209. For this purpose, two embodiments are described with regard to the FIGS. 3 and 4.

Figure 3:
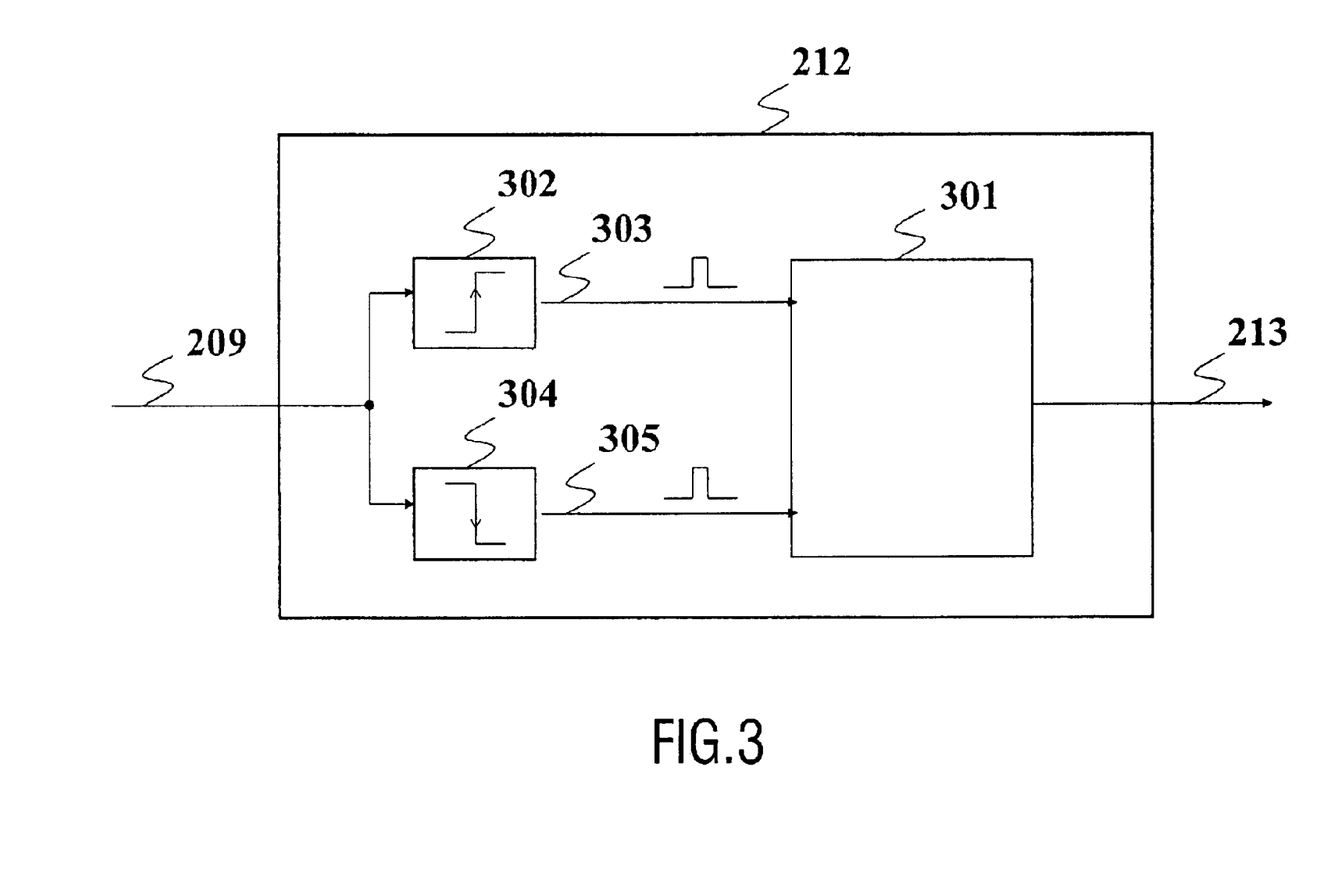
FIG. 3 is a functional representation of a device for generating a clock signal according to a first embodiment of the invention.

FIG. 3 is a functional representation of a device for generating a clock signal 213, according to a first embodiment of the functional unit 212 described in FIG. 2. The functional unit 212 comprises an oscillator 301 generating said second clock signal 213 before any amplification by the amplification stage 211.

The oscillator 301 is characterized by the fact that it can function according to two different modes, that is, in a forced mode or in a free mode, according to the state of said first clock signal 209.

When said first clock signal 209 is actually present, that is, the signal 209 consists of a regular succession of rising and falling edges over time, the oscillator 301 functions in the forced mode. For this purpose, a rising edge detector 302 is provided, delivering an output pulse 303 to the oscillator 301 on each rising edge of the signal 209. Likewise, a falling edge detector 301 is provided delivering an output pulse 305 to the oscillator 301 on each falling edge of the signal 209. The pulses 303 and 305 enable the oscillator 301 to be set to the forced mode as follows:

a pulse 303 acts on the oscillator 301 so that it generates a rising edge in said second clock signal 213, a pulse 305 acts on the oscillator 301 so that it generates a falling edge in said second clock signal 213.

The pulses 303 and 305 cause the reinitialization of the cycle starts of the oscillator 301. This amounts to saying that the oscillator 301 is under the control of the rising and falling edges of the signal 209 since:

a rising edge of said first clock signal 209 triggers a rising edge in said second clock signal 213, a falling edge of said first clock signal 209 triggers a falling edge in said second clock signal 213.

Consequently, when said first clock signal 209 is actually present, the clock signal 213 generated by the oscillator 301 has the same frequency as the clock signal 209.

The natural frequency of the oscillator 301 is less than the frequency of said first clock signal 209 so that, when said first clock signal 209 is actually present, only the rising and falling edges of the clock signal 209 can change the logic levels of said second output signal 213, via the generation of the pulses 303 and 305. In other words, the natural frequency of the oscillator 301 is lower than that of the signal 209 so that, following the action of an edge of the signal 209 causing a change in logic level of the signal 213, the level of the signal 213 does not have time to change freely before the action of the following edge of the signal 209.

When said first clock signal 209 is no longer present, that is to say the signal 209 consists of a logic level (high or low) having the same value over time, the oscillator 301 functions in the free mode. The frequency of the clock signal 213 generated by the oscillator 301 is then the natural frequency of the oscillator 301.

Changing over from the forced mode to free mode takes place automatically. Consider the last edge delivered by the signal 209 before it stops. This edge causes a change in logic level of the signal 213. Since there are no more rising or falling edges in the clock signal 209, the oscillator 301 is no longer reinitialized, so that the logic levels of the clock signal 213 change to a frequency corresponding to the natural frequency of the oscillator. The oscillator then functions in the free mode.

Figure 4:
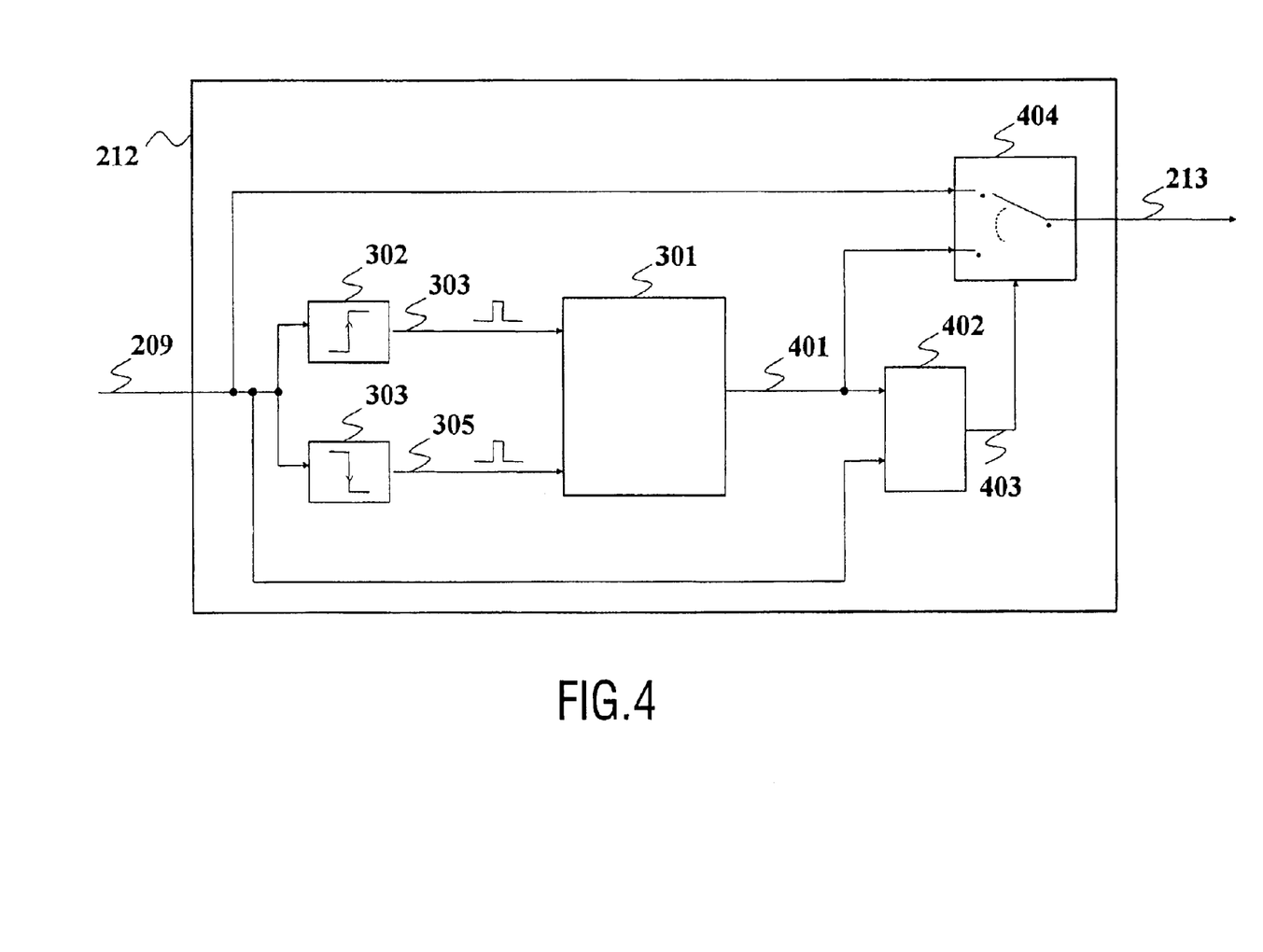
FIG. 4 is a functional representation of a device for generating a clock signal according to a second embodiment of the invention.

FIG. 4 is a functional representation of a device for generating a clock signal 213 according to a second embodiment of the functional unit 212 described in FIG. 2.

This functional unit 212 is composed of the elements 301, 302 and 303 arranged in an identical fashion to FIG. 3, leading to the generation of the clock signal 401 by the oscillator 301. It also has a detector 402 for detecting the presence or absence of rising or falling edges in said first clock signal 209, in order to generate a control signal 403 with two logic levels. For this, the detector 402 performs a simultaneous analysis of the clock signals 209 and 401 which it receives at its inputs.

As seen previously, a rising edge of said first clock signal 209 triggers a rising edge in said second clock signal 401, and a falling edge of said first clock signal 209 triggers a falling edge in said second clock signal 401. Because of the inevitable processing delay in the circuits constituting the detectors 302 and 303, when the oscillator 301 is in forced operation, said second clock signal 401 is late compared with said first clock signal 209. Thus the effective presence of the clock signal 209 is reflected by two situations. The first situation is that, at each rising edge of the signal 401, the signal 209 is at a logic high level. The second situation is that, at each falling edge of the signal 401, the signal 209 is at a logic low level. The detector 402 is responsible for the detection of these two situations.

On each edge of the signal 401, as long as one of these two situations is actually detected by the detector 402, the logic level of said control signal 403 generated by the detector 402 is a first logic level. This first logic level of the control signal 403 therefore indicates the presence of rising or falling edges in said first clock signal 209. The level of the control signal 403 is therefore said first logic level when the oscillator is in the forced mode. On each edge of the signal 401, when one of these two situations is no longer detected by the detector 402, the logic level of said control signal 403 generated by the detector 402 is a second logic level. This second logic level of the control signal 403 therefore indicates the absence of rising or falling edges in said first clock signal. The level of the control signal 403 is therefore said second logic level when the oscillator is in the free mode.

The functional unit 212 also has a multiplexer 404 receiving as an input the clock signal 209 and the clock signal 401. The multiplexer 404 generates said clock signal 213 at its output. The multiplexer 404 is controlled by said control signal 403 in order to switch onto its output either the clock signal 209 if said control signal is in its first logic level, or said clock signal 401 if said control signal is in its second logic level. The multiplexer 404 is chosen so that the transmission time for a digital signal between its inputs and its output is very small, or even almost zero. When the oscillator 301 functions in forced running, the clock signal 213 delivered by the multiplexer is then in phase with the clock signal 209. When the oscillator 301 functions in free running, the clock signal 213 delivered by the multiplexer corresponds to the clock signal 401 generated by the oscillator 301.

In addition to the fact that the control signal 403 triggers the switching of the multiplexer, this control signal 403 can advantageously serve to inform the smart card reader and the smart card that the clock signal 209, for example delivered by a microprocessor, has stopped. Thus, under the action of this control signal a procedure can be triggered to rapidly and rigorously finish the processing currently being carried out on the smart card reader or on the smart card.

Figure 5:
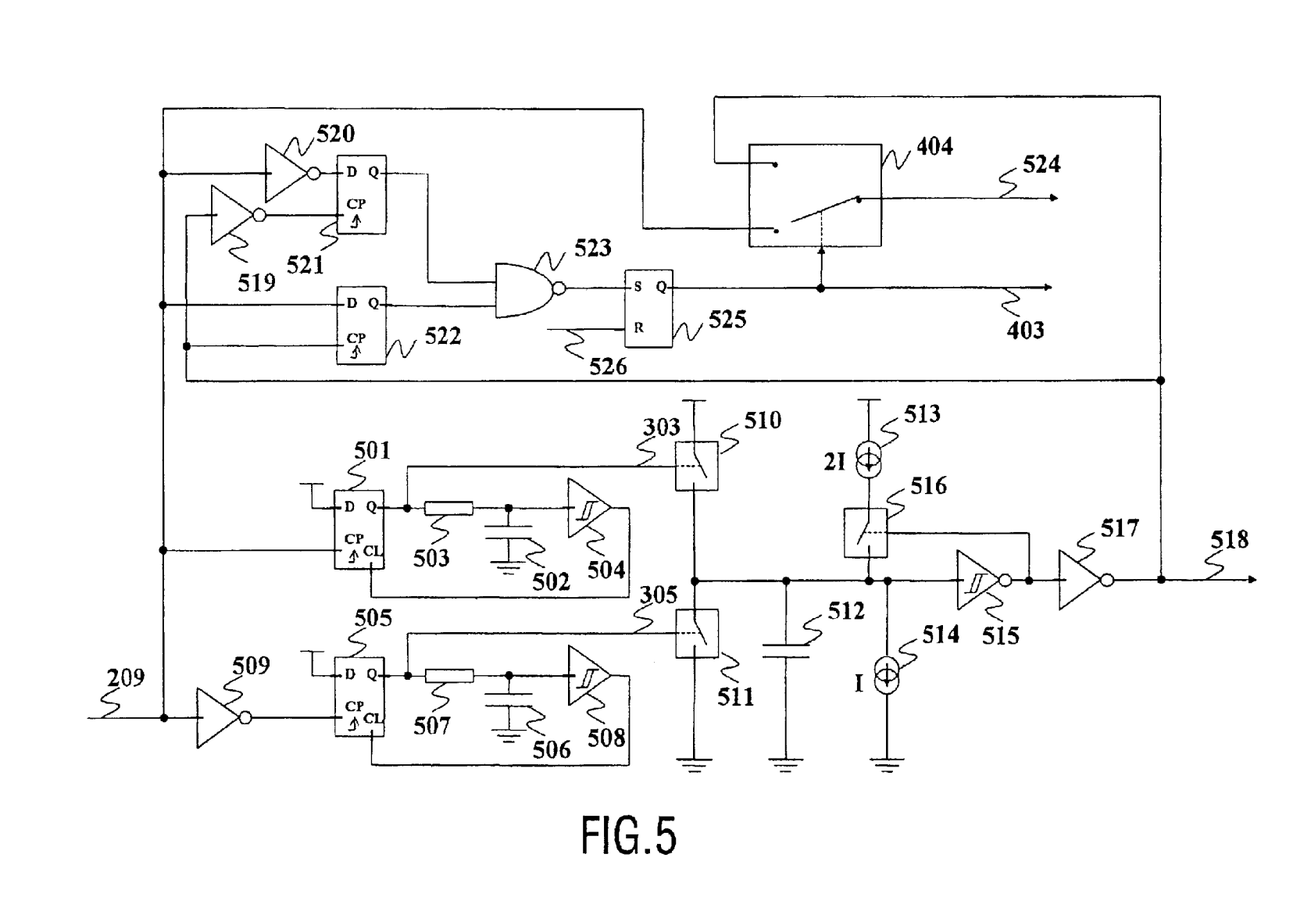
FIG. 5 shows a diagram for implementing a device for generating a clock signal according to the invention.

FIG. 5 shows a diagram for the implementation of a device for generating a clock signal according to the invention. This diagram illustrates an embodiment of the functional unit 212 described in FIGS. 2 and 3.

The rising-edge detector consists of the flip-flop 501, the capacitor 502, the resistor 503 and the trigger 504. The flip-flop 501 receives the clock signal 209 at its input CP. At each rising edge of the clock signal 209, the signal 303 delivered by the flip-flop 501 at its output Q passes to a logic high level. The capacitor 502 then charges up via the resistor 503 and applies its voltage to the input of a trigger 504. The voltage at the terminals of the capacitor 502 increases until the triggering threshold of the trigger is reached. The output signal of the trigger 504 being connected to the zeroing input CL of the flip-flop 501 when said threshold is reached said output signal passes to a logic high level which initializes the flip-flop 501. The effect of this is that the signal 303 goes to a logic low level again. In this way, on each rising edge of the clock signal 209 a pulse is generated by the signal 303.

The falling-edge detector consists of the flip-flop 504, the capacitor 506, the resistor 507, the trigger 508 and the inverter 509. The elements 505 to 508 fulfill the same role as the elements 501 to 504, except that the flip-flop receives at its input CP the signal 209 inverted by the inverter 509. In this way, on each falling edge of the clock signal 209 a pulse is generated by the signal 305.

The oscillator 301 consists of the switches 510 and 511 controlled by the signals 303 and 305, the capacitor 512, the current sources 513 and 514, the inverting trigger 515, the switch 516 controlled by the output signal of said inverting trigger 515, and the inverter 517.

When the oscillator 301 functions in the free mode, there is no pulse 303 and 305 generated so that the switches 510 and 511 remain open. The capacitor 512 being initially discharged, the output signal of the inverting trigger 515 is at a high level which closes the switch 516. The capacitor 512 then charges with a current of value I via the current source 513. This is because the current of value 2I delivered by the current source 513 is divided into a current of value I which passes through the current source 514 and a current of value I which passes through the capacitor 512. When the voltage at the terminals of the capacitor 512 reaches the rising edge triggering threshold of the inverting trigger 515, the output of the inverting trigger 515 passes to a logic low level. The switch 516 then returns to the open position, which causes the charging of the capacitor 512 by the current source 514 with a current of value I. When the voltage at the terminals of the capacitor 512 reaches the falling-edge triggering threshold of the inverting trigger 515, the output of the inverting trigger 515 goes to a logic high level again, causing the closure of the switch 516. Once again, the capacitor 512 charges up with a current of value I via the current source 513 in order to start a new oscillation cycle.

The inverter 517 provides the inversion of the signal generated by the inverting trigger 515, and delivers the clock signal 518 at its low-impedance output. The clock signal 518 corresponds to the clock signal 213 generated by the device described in FIG. 3.

The natural frequency of the clock signal 518 is determined by the value of the current generated by the current sources 513 and 514, by the value of the capacitor 512, and the value of the triggering thresholds of the inverting trigger 515.

The oscillator 301 functions in the forced mode when it receives pulses 303 and 305 on command from the switches 510 and 511. A pulse 303 causes a short-duration closure of the switch 510, which causes the charging of the capacitor 512. In a similar fashion, a pulse 503 causes a short-duration closure of the switch 511, which causes the discharge of the capacitor 512. In the forced mode, the charging cycle of the capacitor 512 is then reinitialized on each pulse 303 or 305, that is to say on each edge of the clock signal 209. Between each reinitialization, the capacitor 512 is charged by the current generated either by the current source 513 or by the current source 514, depending on the level of the signal delivered by the inverting trigger 515.

The detector 402 comprises the inverters 519 and 520, the D flip-flops 521 and 522, the RS flip-flop 525 and the logic NAND gate 523. The detector 402 receives as an input the clock signal 209 and the clock signal 518 generated by the inverter 517, in order to deliver the control signal 403 as an output of the logic gate 523.

The multiplexer 404 receives at its two inputs the clock signal 209 and the clock signal 518. As long as rising or falling edges are actually present in the clock signal 209, the signal delivered by the logic gate 523 is at a low level. As soon as the clock signal stops, the signal delivered by the logic gate 523 passes to the high state, which also causes the passage to the high state of the control signal 403. The switching of one of the two inputs onto the output of the demultiplexer 404 is provided by the control signal 403. When the control signal 403 has a logic low level, the output signal 524 corresponds to the clock signal 518 whilst, when the control signal 403 has a logic high level, the output signal 524 corresponds to the clock signal 209. The output signal 524 corresponds to the signal 213 in FIG. 4.

The signal 403 can advantageously be sent to inform the smart card reader that the signal 209 has stopped, so as to initiate a particular procedure, for example a procedure for finishing the current processing operations, or a procedure of putting on standby. According to this procedure, once the signal 209 is once again present, a reset signal 526 is generated by the smart card reader in order to initialize the flip-flop 525 so that the multiplexer delivers the signal 209 at its output.

In an improved embodiment, slaving means are provided for slaving the natural frequency of the oscillator 301 to the frequency of the clock signal 209. For this purpose, known means of the state of the art of the phase-lock ad loop type can be used. The natural frequency of the oscillator 301 is then slaved so that it is lower than the frequency of the signal 209 by a few percentage points only.

Figure 6:
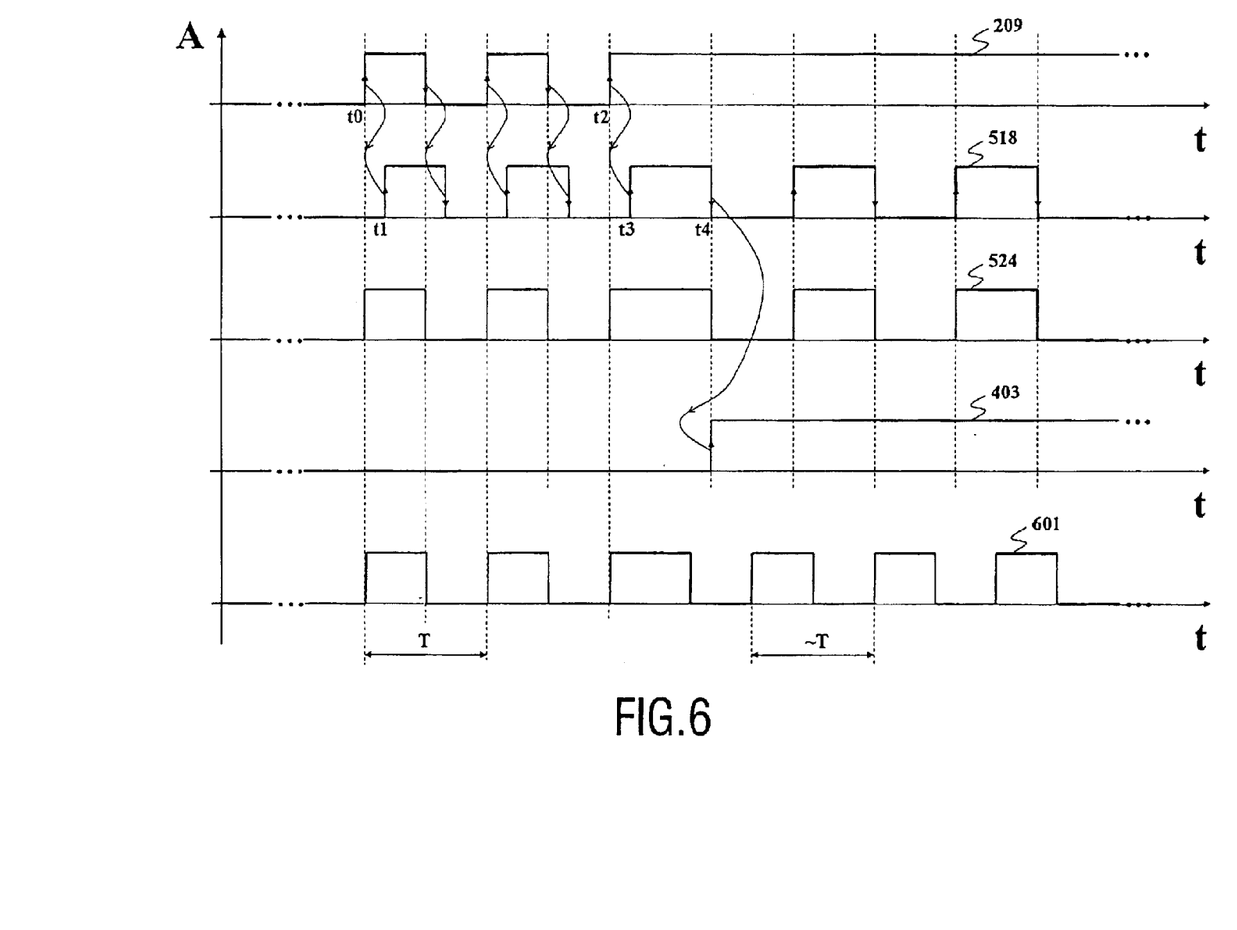
FIG. 6 shows the changes in the various signals generated over time by a device for generating a clock signal according to the invention.

FIG. 6 shows the change in the amplitude A of the signals 209-518-524-403-601 generated over time by the device described in FIG. 5.

Between the instants t0 and t2, the clock signal 209 is effectively present. The oscillator 301 then functions in forced operation and delivers the clock signal 518. The signal 518 has the same frequency as the signal 209, and is delayed by an amount (t1–t0) with respect to the signal 209. As from the instant t2, the signal 209 stops, for example, following the drop in supply voltage to the microprocessor which generates it. At the instant t3, the last edge generated by the signal 209 causes a change of level in the signal 518. The oscillator 301 no longer being reinitialized on the edges of the signal 209, the capacitor 512 charges up until it causes a change in level in the signal 518 to the low state at time t4, the period (t4–t3) corresponding to half a cycle of the oscillator 301. As from the instant time t3, the oscillator functions in the free mode.

As seen previously, the use of the detector 402 and of the multiplexer 404 makes it possible to reduce the shift in time between the signal 209 and the signal 518 when the oscillator is functioning in the forced mode. When the oscillator 301 is functioning is in the forced mode, the control signal 403 is at a low level, so that the multiplexer delivers a signal 524 having an almost zero shift in time with respect to the signal 209. At the instant t4, on the falling edge of the signal 518, the signal 209 is not at a low level as is the case when the signal 209 is actually present, which causes the control signal 403 to go to a high level. The multiplexer then delivers the signal generated by the oscillator 301 functioning in the free mode.

The signal 601 corresponds to the signal 524 when the natural frequency of the oscillator 301 is slaved to the frequency of the signal 209.

The device according to the invention has been described in the context of use in a smart card reader, for generating a clock signal sent to a smart card. However, the device according to the invention can also be used and implemented in any apparatus intended to generate a clock signal without interruption over time.

In particular, the device can be implemented in a portable apparatus, such as a mobile telephone or a personnel assistant, comprising a smart card reader.

What is claimed is:

1. A device for generating an output clock signal intended to time a digital processing circuit, said generating device receiving a first clock signal, characterized in that it comprises an oscillator generating a second clock signal constituting said output clock signal, said oscillator functioning in an forced mode under the control of the rising and falling edges of said first clock signal, said oscillator functioning in a free mode in the absence of rising or falling edges in said first clock signal, the natural frequency of said oscillator being lower than the frequency of said first clock signal.

2. A device for generating an output clock signal intended to time a digital processing circuit, said generating device receiving a first clock signal, characterized in that it comprises:

an oscillator generating a second clock signal, said oscillator functioning in a forced mode under the control of the rising and falling edges of said first clock signal, said oscillator functioning in a free mode in the absence of rising or falling edges in said first clock signal, the natural frequency of said oscillator being lower than the frequency of said first clock signal, detection means for detecting the presence or absence of rising or falling edges in said first clock signal, in order to generate a control signal with two logic levels, a first logic level indicating the presence of rising or falling edges in said first clock signal, a second logic level indicating the absence of rising or falling edges in said first clock signal, a multiplexer receiving as an input said first clock signal and said second clock signal, said multiplexer generating at its output said output clock signal, said multiplexer being controlled by said control signal in order to switch said first clock signal onto its output if said control signal is in its first logic level, or for switching said second clock signal onto its output if said control signal is in its second logic level.

3. A device for generating a clock signal as claimed in claim 1, characterized in that it comprises slaving means for slaving the natural frequency of said oscillator to a frequency lower than the frequency of said first clock signal by a few percentage points.

4. Smart card reader comprising a device for generating an output clock signal as claimed in claim 1.

5. Portable telephone comprising a smart card reader, said smart card reader comprising a device for generating an output clock signal as claimed in claim 1.

* * * * *